United States Patent [19]

Murase et al.

[11] 4,403,049

[45] Sep. 6, 1983

[54] METHOD OF MANUFACTURING POLYESTER FIBERS WITH GOOD ADHESION TO RUBBER

[75] Inventors: Shigemitsu Murase; Kazushige Kudo, both of Joyo; Shigeo Yamamoto, Uji, all of Japan

[73] Assignee: Unitika Limited, Hyogo, Japan

[21] Appl. No.: 327,829

[22] Filed: Dec. 7, 1981

[30] Foreign Application Priority Data

Jan. 29, 1981 [JP] Japan ................................. 56-12669

[51] Int. Cl.³ .......................... A23F 3/00; B29H 5/02; D01F 1/02; D06M 13/18
[52] U.S. Cl. ..................................... 523/455; 8/115.6; 8/DIG. 4; 156/110 A; 252/8.9; 264/211; 427/387; 523/400
[58] Field of Search .......................... 8/115.6, DIG. 4; 156/110 A; 252/8.9; 427/387; 523/400, 455; 264/211

[56] References Cited

U.S. PATENT DOCUMENTS

| | | | |
|---|---|---|---|
| 2,902,398 | 9/1959 | Schroeder | 156/110 A |
| 3,436,288 | 4/1969 | Patterson | 156/110 A |
| 3,775,150 | 11/1973 | McClary | 156/110 A |
| 3,868,985 | 3/1975 | Georges | 152/359 |
| 4,210,700 | 7/1980 | Marshall et al. | 156/110 A |
| 4,348,517 | 9/1982 | Chakravarti | 156/110 A |

FOREIGN PATENT DOCUMENTS

| | | | |
|---|---|---|---|
| 736446 | 6/1966 | Canada | 156/110 A |
| 1310104 | 11/1961 | France | 156/110 A |
| 1035220 | 7/1966 | United Kingdom | 156/110 A |

*Primary Examiner*—Ronald W. Griffin
*Attorney, Agent, or Firm*—Richard A. Anderson

[57] ABSTRACT

A method of manufacturing polyester fibers with good adhesion to rubber is disclosed, characterized in that, in the process of spinning polyester fiber, a spinning oil containing an epoxy compound, an ethylene urea compound, and an ethylene urea compound polymerization catalyst is added, and it is then heat treated.

36 Claims, No Drawings

METHOD OF MANUFACTURING POLYESTER FIBERS WITH GOOD ADHESION TO RUBBER

BACKGROUND OF THE INVENTION

This invention concerns a method of manufacturing polyester fibers with good adhesion to rubber.

Polyester fibers, represented by polyethylene terephthalate, have excellent physical and chemical properties and are very useful fibers which are mass produced industrially and are widely used in various fields. They are also a very suitable material for reinforcing rubber.

However, polyester fibers have the great defect that they are inferior in adhesion to rubber compared to polyamide fibers such as nylon 6, nylon 6,6, etc., which are also typical industrial fibers.

Thus, when polyamide fibers are simply treated with a resorcinol-formaldehyde-rubber latex (RFL) adhesive, they have good adhesion with rubber, but in the case of polyester fibers, even when this RFL treatment is performed, good adhesion cannot be obtained.

For this reason, many attempts have already been made to improve the adhesion of polyester fibers to rubber. Typical methods for doing this are: (1) when treating the raw cord textile with the RFL treatment (the so-called "dipping treatment"), it is first pretreated with an adhesive such as an epoxy compound, an isocyanate compound, an ethylene urea compound, etc., and then treated with RFL or RFL mixed with an esterophile ingredient such as a novolak resin, or 2,6-bis(2',4'-dihydroxyphenylmethyl)-4-chlorophenol, known by the trade name "Pexul", and (2) an adhesive such as an epoxy compound, an isocyanate compound, etc., is added at the yarn stage followed by dip-treating with RFL. The former method, although it does give the desired adhesiveness to some degree, has the defects that it requires a large quantity of adhesive, and the treatment method is troublesome, which tends to increase the cost. The latter method, although it has the practical advantage that, like the polyamide fibers, the later dip treatment can be performed with RFL alone, has the defect that the essential adhesive function is somewhat insufficient. Consequently, particularly in the latter method, a new problem is created that, in order to increase the adhesion, the method of treating the yarn itself must be performed under conditions which deviate greatly from the practical range. The concentration of the adhesive used in treating the yarn is markedly increased; the heat treatment conditions are made extremely severe, etc.

SUMMARY OF THE INVENTION

Against such a background, this invention makes possible the manufacturing of polyester fibers with good adhesion to rubber by the very simple method of adding the adhesive at the same time the spinning oil (finish) is added, when the polyester fiber is spun, and then heat treating by using the heat treatment of the subsequent drawing process, after which only RFL treatment is performed.

That is, this invention is characterized in that, in the process of spinning the polfyester fiber, a spinning oil (finish) containing an epoxy compound, an ethylene urea compound, and an ethylene urea compound polymerization catalyst is added, and it is then heat treated. By this invention, the adhesion is increased to a surprising degree, and severe heat treatment is made unnecessary as well.

The epoxy compound of this invention is ordinarily synthesized by the reaction of an epoxy compound containing a halogen, e.g., epichlorohydrin, and a polyhydric alcohol or polyhydric phenol. Examples of such polyhydric alcohols or phenols are polyhydric alcohols such as glycerol, ethylene glycol, diethylene glycol, propylene glycol, sorbitol, polyethylene glycol, polypropylene glycol, trimethylol propane, or their derivatives; and polyhydric phenols such as resorcinol, catechol, hydroquinone, or their derivatives. One may also use cyclohexane epoxide, diglycidyl ether, etc., obtained by oxidizing the unsaturated bonds with peracetic acid.

The ethylene urea compound in this invention is a compound obtained by the reaction of a diisocyanate and an ethylene imine, e.g., a polymethylene bis(ethylene urea) represented by tetramethylene bis(ethylene urea), hexamethylene bis(ethylene urea), and decamethylene bis(ethylene urea), 2,4-tolylene diethylene urea, 4,4'-diphenyl methane diethylene urea, 1,2-phenylene diethylene urea, 2,6-naphthylene diethylene urea, 4,4'-biphenyldiethylene urea, etc.

Examples of the ethylene urea compound polymerization catalyst are aluminum chloride, aluminum bromide, tin tetrachloride, iron trichloride, lead acetate, lead propionate, aniline, m-phenylene diamine, piperazine, etc. Among these, the organic amines are particularly effective, since they can also serve as polymerization catalysts for the epoxy compound.

The spinning oil contains, besides the three above-mentioned compounds, natural oils such as mineral oil, coconut oil, rapeseed oil, sperm oil, etc., or synthetic oils such as esters of higher alcohols or polyhydric alcohols and higher fatty acids. Moreover, it may also contain sufficient surfactant to emulsify and disperse the lubricating agent ingredients, and, if desired, antistatic agents, heat-resisting agents, coloring agents, etc. There is not necessarily any need to use a surfactant as an emulsifying and dispersing agent, but in general it is desirable to use a compound of castor oil or a higher alcohol to which an alkylene oxide has been added, polyethylene glycol, or an ester of polyethylene glycol and a higher fatty acid, etc. Of course, such a surfactant can also be the emulsifying and dispersing agent of the epoxy compound and the ethylene urea compound.

The proportion of the ingredients in the spinning oil should be 5–50 weight percent epoxy compound, 3–30 weight percent ethylene urea compound, 0.01–1.0 weight percent ethylene urea compound polymerization catalyst, 20–70 weight percent lubricating agent, 10–50 weight percent emulsifier, and suitable quantities of other additives to make a total of 100 weight percent.

If the proportions of the mixture are within these ranges, the original lubricating and adhering functions of the spinning oil will not be lost, and the increase in adhesiveness aimed for will be produced.

The "polyester" in this invention refers to a polycondensate of a compound with two ester-forming OH groups, typified by ethylene glycol, and a compound with two ester-forming carboxyl groups, typified by terephthalic acid; a typical example is polyethylene terephthalate. However, the polyester is not limited to homopolymers; copolymers are also possible and compounds with three or more ester-forming groups may be used as copolymer ingredients, as long as they are within the range that will not hinder their fiber-forming ability.

The spinning process referred to is the process of spinning-winding-drawing-winding. Of course, a spin-draw type of process, directly connecting the spinning and the drawing processes, may also be used. The spinning oil (finish) may be added at any desired stage of the operation, by the roller, immersion, spray, or other methods. The spinning oil is used in the ordinary aqueous emulsion form, but it may also be used as a straight oil, diluted with low-viscosity mineral oil, etc., as long as dispersion and emulsification of the adhesive is possible. The addition of the oil may be performed two or more times. It is desirable for the total quantity of oil added to be 0.2–2 weight percent. Treatment with a spinning oil which lacks one or more of the epoxy compound, ethylene urea compound, and ethylene urea compound polymerization catalyst may be combined with treatment with the spinning oil of this invention. After adding the oil, heat treatment is performed at 150°–250° C. for a period from 0.05 to several seconds. The method of heat treatment may be hot plate, hot rollers, slit heater, oven, etc. This heat treatment may correspond exactly to the drawing process, i.e., the heat treatment conditions of the drawing process will become the heat treatment conditions required by this invention, without change. Thus, this invention may be said to be extremely practical. The simplest application of the method of this invention is to use the yarn-forming oil of this invention itself as the spinning oil, and then to perform the normal hot drawing treatment. Thus, the composition of this invention has the great advantages, from a practical point of view, that it can be applied as the spinning oil and that the severe heat treatment conditions of conventional methods are unnecessary.

Obviously, the molecular weight, denier, filament number, cross-sectional shape, properties of the yarn material, fine structure, presence or absence of additives, and polymer properties (concentration of terminal carboxyl groups, etc.) are not limited in any way.

The polyester fibers obtained by the method of this invention will have extremely good adhesion with rubber merely upon application of the normal RFL treatment, after twisting and weaving by the normal methods.

This increase in adhesion does not stop with an improvement of the polyester fiber itself, but is also directly connected with an improvement in the quality of the rubber product which is being reinforced, and thus has great practical value.

DESCRIPTION OF PREFERRED EMBODIMENTS

This invention will be explained concretely by the actual examples given below. The measurement of intrinsic viscosity in the actual examples was performed in a mixed solvent of phenol and tetrachloroethane (1/1 weight ratio) at 20° C.

The measurement of the adhesive force with the rubber was performed by the following method. The original yarn was made into raw cord (twisting, twining together) which was made into dip cord (dip treatment), embedded in the rubber, and vulcanized, after which the adhesive force between the cord and the rubber was measured.

In this process, the raw cord was made by twining with a ring twisting machine at 40 times/10 cm; two of these cords were twined together in the same manner at 40 times/10 cm.

The dip treatment was performed under the following conditions:

| SOLUTION A | |
|---|---|
| Resorcinol | 15 Parts |
| Formaldehyde | 20 Parts |
| Caustic Soda | 0.4 Parts |
| Water | 290 Parts |

| SOLUTION B | |
|---|---|
| Vinyl pyridine-butadiene-latex liquid (40 percent) | 240 Parts |
| Butadiene-styrene latex (40 percent) | 80 Parts |
| Water | 347 Parts |

Solution A was cured at 25° C. for six hours. Solution B was cured at 25° C. for four hours. The two solutions were mixed, and again cured at 25° C. for twleve hours.

| DIPPING CONDITIONS | |
|---|---|
| Target Adhering Quantity (Solid Part) | 5% |
| Drying Zone | 80° C. × 30 Seconds |
| Curing Zone (2 Chambers) | 230° C. × 80 Seconds × 2 Times |

The method of vulcanization was as follows: In an H-test mold, the dipped cord was embedded in unvulcanized rubber, the principal ingredients of which were: 30 parts smoked sheet, 70 parts styrenebutadiene rubber, 40 parts carbon black, 5 parts zinc oxide, 1.5 parts stearic acid, 1 part phenyl-beta-naphthyl amine, 0.3 part phthalic anhydride, 0.8 part vulcanization accelerator, 0.15 part diphenyl guanidine, and 2 parts sulfur. The rubber was vulcanized by heating at 140° C. for 40 minutes, and the adhesive treatment was performed.

The method of measuring the adhesive force was the "H-test method". The load required to pull out the cord embedded in rubber to a depth of 1 cm was measured.

ACTUAL EXAMPLE 1

Polyethylene terephthalate (PET) with an intrinsic viscosity of 0.95 was spun with an extruder-type melt spinner at a melting temperature of 290° C., a discharge quantity of 450 grams/minute, and a winding speed of 450 m/minute. In doing so, the nine spinning oils shown in Table 1 were added so that the quantity of effective ingredients that adhered was 0.9 weight percent, and the yarn was wound.

Next, the yarn was drawn and heat-treated with a two-stage drawing machine composed of No. 1 rollers (100° C.), No. 2 rollers (100° C.), a hot plate (240° C.), No. 3 rollers (230° C.), and winding rollers. The time of passing over the hot plate was 0.2 second, the time of essential treatment by the No. 3 rollers 0.2 second, the total drawing ratio 6.0 fold, and the winding rate 200 m/minute. A PET fiber of 1500 denier/192 filament was obtained.

When the yarn was made, the yarns of Examples 1–6 of this invention had good stability and lubrication, and the operation could be performed smoothly, but the other oils, 7-9, were lacking in oil stability and their yarn-making qualities were therefore not smooth.

The fiber obtained was twisted and made into raw cord. This was then dip-treated with RFL solution, and the adhesive property of this treated cord with rubber was measured. The results shown in Table 2 were obtained.

As is clear from Table 2, Examples 1-6 of this invention show markedly higher adhesive powers than the Comparative Examples 7-9. Especially from the comparison of Example 1 of this invention and Comparative Example 7, the effect of the presence of an ethylene urea compound polymerization catalyst on the adhesive power is evident.

ACTUAL EXAMPLE 2

A PET spun yarn with an intrinsic viscosity of 0.90 was fed, without winding, directly to a spin-draw apparatus composed of No. 1 rollers (with separating rollers attached), No. 2 rollers (Nelson rollers, 150° C.), No. 3 rollers (Nelson rollers, 200° C.), No. 4 rollers (Nelson rollers, 210° C.), and No. 5 rollers (separating rollers attached, 230° C.). It was drawn in two stages, a total of 6.0 fold, and finally wound at a rate of 1000 m/minute. A 1500 denier/192 filament PET fiber was produced. In this process, a straight oil composed principally of low-viscosity mineral oil, coconut oil, etc., was added, at 0.5 weight percent, and, in addition, the oils of No. 1 and No. 7 of Actual Example 1 were added between the No. 4 and No. 5 rollers, each oil at 1.0 weight percent, and heat treatment was performed for one second with the No. 5 rollers. The adhesive forces of the fibers obtained were 16.6 kg/cm with the No. 1 oil and 13.5 kg/cm with the No. 7 oil. Thus, the superiority of the former, an example of this invention, was evident.

TABLE 1

| Oil | 1 | 2 | 3 | 4 | 5 | 6 | 7 | 8 | 9 |
|---|---|---|---|---|---|---|---|---|---|
| LUBRICANTS | | | | | | | | | |
| Coconut Oil | 30 | 30 | | | | | 30 | | |
| Rapeseed Oil | | | 30 | | | 25 | | 20 | |
| Isostearyl Oleate | | | | 30 | | 10 | | | |
| Glycerine Oleate | | | | | 30 | | | 30 | 30 |
| EMULSIFIERS | | | | | | | | | |
| POE (20) Castor Oil | 10 | | 10 | 15 | | | 10 | | |
| POE (20) Hardened Castor Oil | | 5 | 5 | 10 | | 20 | | 20 | 20 |
| POE (15) Lauryl Phenol | 10 | 5 | 15 | | 5 | | 15 | | |
| PEG (Molecular Weight 400) Dioleate | 5 | 10 | | | 20 | 10 | | 15 | 15 |
| PEG (Molecular Weight 500) Monooleate | | 5 | | | | | | | |
| ADDITIVES | | | | | | | | | |
| Epicote 812 | 30 | 30 | 20 | | | 20 | 30 | | 30 |
| Denacol EX-421 | | | | 30 | 30 | | | | |
| 4,4'-Diphenyl-methane Diethylene Urea | 10 | | 15 | 10 | | 10 | 10 | 10 | |
| 2,4-Tolylane Diethylene Urea | | 10 | | | 10 | | | | |
| CATALYSTS | | | | | | | | | |
| Aluminum Chloride | 0.3 | | | | 0.3 | 0.3 | | 0.3 | |
| Iron Trichloride | | 0.3 | | | | | | | |
| m-Phenylene Diamine | | | 0.3 | 0.3 | | | | | 0.3 |
| OTHER | | | | | | | | | |
| Na Dioctyl-sulfosuccinate | 4.7 | 4.7 | 4.7 | 4.7 | 4.7 | 4.7 | 5 | 4.7 | 4.7 |
| TOTAL | | | | | 100 | | | | |

Notes:
(1) Proportions expressed as weight percent. When added, these oils were used as 20 percent aqueous emulsions.
(2) POE means polyoxyethylation; the figures in parentheses are the numbers of moles added; PEG means polyethylene glycol.
(3) Epicote 812 is a trade name of the Shell Chemical Company. It is an epoxy compound with a diglycidyl ether of glycerin as the principal ingredient.
(4) Denacol EX-421 is a trade name of Nagase & Company Ltd. It is an epoxy compound with a triglycidyl ether of diglycerin as the principal ingredient.
(5) 1-6 Are examples of this invention; 7-9 are comparative examples.

TABLE 2

| Oil | Adhesive Power (kg/cm) | Notes |
|---|---|---|
| 1 | 17.9 | Example of this invention |
| 2 | 17.6 | Example of this invention |
| 3 | 18.0 | Example of this invention |
| 4 | 17.5 | Example of this invention |
| 5 | 17.9 | Example of this invention |
| 6 | 17.8 | Example of this invention |
| 7 | 14.5 | Comparative example |
| 8 | 9.2 | Comparative example |
| 9 | 8.4 | Comparative example |

We claim:

1. A method of manufacturing polyester fibers with good adhesion to rubber comprising
   during spinning, adding to the spin finish a composition comprising
   an epoxy compound,
   an ethylene urea compound, and
   a catalyst for the ethylene urea compound, then heat treating the polyester fiber wherein said heat treatment is carried out at 150°-250° C. for a period of 0.05 to several seconds, and wherein said spin finish comprises about 5-50 percent by weight epoxy compound, 3-30 percent by weight of ethylene-urea compound, 0.01-0.1 percent by weight catalyst for ethylene-urea composition, 20-70 percent by weight lubricant, and 10-50 percent by weight emulsifier.

2. The method of claim 1 wherein the epoxy compound is the reaction product of an epoxy compound containing a halogen with a polyhydric alcohol.

3. The method of claim 1 wherein the epoxy compound is the reaction product of an epoxy compound containing a halogen with a polyhydric phenol.

4. The method of claim 2 wherein the polyhydric alcohol is selected from the group consisting of glycerol, ethylene glycol, diethylene glycol, propylene glycol, sorbitol, polyethylene glycol, polypropylene glycol, trimethylol propane and their derivatives.

5. The method of claim 3 wherein the polyhydric phenol is selected from the group consisting of resorcinol, catechol, hydroquinone and their derivatives.

6. The method of claim 1 wherein the epoxy compound is cyclohexane epoxide.

7. The method of claim 1 wherein the epoxy compound is diglycidyl ether.

8. The method of claim 1 wherein the ethylene urea compound is obtained by the reaction of a diisocyanate and an ethylene imine.

9. The method of claim 1 wherein the ethylene urea compound is selected from the group consisting of tetramethylene bis(ethylene urea), hexamethylene bis(ethylene urea), decamethylene bis(ethylene urea), 2,4-tolylene diethylene urea, 4,4'-diphenyl methane diethylene urea, 1,2-phenylene diethylene urea, 2,6-naphthylene diethylene urea, and 4,4'-biphenyl diethylene urea.

10. The method of claim 1 wherein the ethylene urea compound polymerization catalyst is selected from the group consisting of aluminum chloride, aluminum bromide, tin tetrachloride, iron trichloride, lead acetate, lead propionate, aniline, m-phenylene diamine, and piperazine.

11. The method of claim 1 wherein the spin finish contains a lubricant and a surfactant.

12. The method of claim 11 wherein the lubricant is selected from the group consisting of natural oils, esters of higher alcohols and esters of polyhydric alcohols and higher fatty acids.

13. The method of claim 11 wherein the surfactant is selected from the group consisting of a castor oil compound, a higher alcohol to which an alkylene oxide has been added, polyethylene glycol, and an ester of polyethylene glycol and a higher fatty acid.

14. The method of claim 1 wherein the heat treatment is drawing of the polyester fibers.

15. A spin finish for use during spinning of polyester fibers comprising
    a lubricant
    an emulsifier
    an epoxy compound
    an ethylene urea compound, and
    a catalyst for the ethylene urea compound
    wherein said spin finish comprises about 5-50 percent by weight epoxy compound, 3-30 percent by weight of ethylene urea compound, 0.01-0.1 percent by weight catalyst for the ethylene urea compound, 20-70 percent by weight lubricant, and 10-50 percent by weight emulsifier.

16. The finish of claim 15 wherein the epoxy compound is the reaction product of an epoxy compound containing a halogen with a polyhydric alcohol.

17. The finish of claim 15 wherein the epoxy compound is the reaction product of an epoxy compound containing a halogen with a polyhydric phenol.

18. The finish of claim 16 wherein the polyhydric alcohol is selected from the group consisting of glycerol, ethylene glycol, diethylene glycol, propylene glycol, sorbitol, polyethylene glycol, polypropylene glycol, trimethylol propane and their derivatives.

19. The finish of claim 17 wherein the polyhydric phenol is selected from the group consisting of resorcinol, catechol, hydroquinone and their derivatives.

20. The finish of claim 15 wherein the epoxy compound is cyclohexane epoxide.

21. The finish of claim 15 wherein the epoxy compound is diglycidyl ether.

22. The finish of claim 15 wherein the ethylene urea compound is obtained by the reaction of a diisocyanate and ethylene imine.

23. The finish of claim 15 wherein the ethylene urea compound is selected from the group consisting of tetramethylene bis(ethylene urea), hexamethylene bis(ethylene urea), decamethylene bis(ethylene urea), 2,4-tolylene diethylene urea, 4,4'-diphenyl methane diethylene urea, 1,2-phenylene diethylene urea, 2,6-naphthylene diethylene urea, and 4,4'-biphenyl diethylene urea.

24. The finish of claim 15 wherein the ethylene urea compound polymerization catalyst is selected from the group consisting of aluminum chloride, aluminum bromide, tin tetrachloride, iron trichloride, lead acetate, lead propionate, aniline, m-phenylene diamine, and piperazine.

25. The finish of claim 15 wherein the finish contains a lubricant and a surfactant.

26. The finish of claim 25 wherein the lubricant is selected from the group consisting of natural oils, esters of higher alcohol, and esters of polyhydric alcohols and higher fatty acids.

27. The finish of claim 25 wherein the surfactant is selected from the group consisting of a castor oil compound, a higher alcohol to which an alkylene oxide has been added, polyethylene glycol, and an ester of polyethylene glycol and a higher fatty acid.

28. The finish of claim 25 wherein the ethylene urea compound is selected from the group consisting of tetramethylene bis(ethylene urea), hexamethylene bis(ethylene urea), decamethylene bis(ethylene urea), 2,4-tolylene diethylene urea, 4,4'-biphenyl methane diethylene urea, 1,2-phenylene diethylene urea, 2,6-naphthalene diethylene urea and 4,4'-biphenyl diethylene urea.

29. The finish of claim 25 wherein the ethylene urea compound is obtained by a reaction of a diisocyanate and ethyleneimine.

30. The finish of claim 25 wherein the epoxy compound is a reaction product of an epoxy compound containing a halogen with a polyhydric alcohol.

31. The finish of claim 25 wherein the epoxy compound is the reaction product of an epoxy compound containing a halogen with a polyhydric phenol.

32. The finish of claim 30 wherein the polyhydric alcohol is selected from the group consisting of glycerol, ethylene glycol, diethylene glycol, propylene glycol, sorbitol, polyethylene glycol, polypropylene glycol, trimethylol propane and their derivatives.

33. The finish of claim 31 wherein the polyhydric phenol is selected from the group consisting of resorcinol, catechol, hydroquinone and their derivatives.

34. The finish of claim 25 wherein the epoxy compound is cyclohexane epoxide.

35. The finish of claim 25 wherein the epoxy compound is glycidyl ether.

36. The finish of claim 25 wherein the ethylene urea compound polymerization catalyst is selected from the group consisting of aluminum chloride, aluminum bromide, tin tetrachloride, iron trichloride, lead acetate, lead propionate, aniline, m-phenylene diamine, and piperazine.

* * * * *